United States Patent [19]
Koopman

[11] Patent Number: 5,660,103
[45] Date of Patent: Aug. 26, 1997

[54] HUMIDITY GENERATING SYSTEM

[75] Inventor: Peter J. Koopman, Richmond, Ind.

[73] Assignee: Henny Penny Corporation, Faton, Ohio

[21] Appl. No.: 56,551

[22] Filed: May 5, 1993

[51] Int. Cl.$^6$ .................................................. A21B 1/08
[52] U.S. Cl. ................... 99/468; 99/470; 99/476; 99/483
[58] Field of Search ........................... 99/483, 468, 470, 99/476

[56] References Cited

U.S. PATENT DOCUMENTS

| | | |
|---|---|---|
| H229 | 3/1987 | Phillips . |
| 3,189,460 | 6/1965 | Smith . |
| 3,377,943 | 4/1968 | Jaremus . |
| 3,508,881 | 4/1970 | Hagenauer et al. ............ 99/468 |
| 3,943,841 | 3/1976 | Huang ............................... 99/470 |
| 4,066,011 | 1/1978 | Ballentine . |
| 4,173,215 | 11/1979 | Bureau et al. .................. 99/476 |
| 4,187,325 | 2/1980 | Tyree . |
| 4,426,923 | 1/1984 | Ohata ............................... 99/468 |
| 4,483,243 | 11/1984 | Cote .................................. 99/468 |
| 4,602,503 | 7/1986 | Hile et al. . |
| 4,623,780 | 11/1986 | Shelton ............................ 99/476 |
| 4,635,540 | 1/1987 | Dowds . |
| 4,667,591 | 5/1987 | Garbar et al. . |
| 4,674,402 | 6/1987 | Raufeisen ........................ 99/468 |
| 4,676,152 | 6/1987 | Tsuji et al. ..................... 99/476 |
| 4,700,887 | 10/1987 | Timmons . |
| 4,722,268 | 2/1988 | Rightley . |
| 4,729,246 | 3/1988 | Melgaard et al. . |
| 4,750,545 | 6/1988 | Hile et al. . |
| 4,829,891 | 5/1989 | Satake . |
| 4,830,278 | 5/1989 | Kohmura et al. . |
| 4,920,948 | 5/1990 | Koether et al. . |
| 4,939,987 | 7/1990 | Smith ............................... 99/483 |
| 5,026,567 | 6/1991 | Manser et al. . |
| 5,072,666 | 12/1991 | Hullstrung ...................... 99/483 |
| 5,083,505 | 1/1992 | Kohlstrung et al. . |
| 5,201,364 | 4/1993 | Tippmann et al. . |
| 5,272,963 | 12/1993 | Del Fabbro ..................... 99/470 |
| 5,279,212 | 1/1994 | Coupe . |
| 5,442,994 | 8/1995 | Parker ............................. 99/483 |

*Primary Examiner*—David Scherbel
*Assistant Examiner*—James F. Hook
*Attorney, Agent, or Firm*—Baker & Botts, L.L.P.

[57] ABSTRACT

A humidity controlled holding cabinet for storing food products or other items at controlled heat and humidity levels having an environment conditioning system. The system comprises a chamber with at least one access and containing heat and humidity detection devices which signal a microprocessor when heat or humidity, or both, deviate from predetermined parameters. The microprocessor controls a heater and a humidity control device that are contained in a module located adjacent to the chamber. Air is drawn from the chamber by a forced air blower and is circulated and recirculated through the module. Depending on the input from the detection devices, the microprocessor will instruct the heater to heat the air or the humidity control device to increase the humidity of the air. The system may also exhaust air containing excess heat or humidity, or both. The system also may be equipped with means to recapture water from exhausted air carrying excess humidity.

18 Claims, 3 Drawing Sheets

HUMIDITY GENERATING SYSTEM

BACKGROUND OF THE INVENTION

1. Field Of The Invention

This invention relates to a closed-loop system for monitoring and maintaining the temperature and humidity of air within a holding cabinet. In particular, the invention relates to a system for use in a heat and humidity controlled cabinet for holding food products which monitors and adjusts air temperature and humidity to maintain substantially constant levels despite the opening and closing of the cabinet access.

2. Description Of The Related Art

There are presently numerous cabinets for holding food products or other items in a temperature and humidity controlled state. These cabinets, however, suffer from a common shortcoming. When the cabinets are opened to insert additional food products or other items or to remove such products or items from the cabinets, heat and humidity are lost. Unless the lost heat and humidity can be restored, the items stored in the cabinets may cool or dry out, or both.

Previously, various methods have been attempted to maintain heat and humidity within such cabinets. For example, pans of water have been placed in the cabinets and allowed to evaporate naturally in an attempt to maintain humidity. Despite its simplicity, this method has not been completely successful. Natural evaporation cannot quickly compensate for humidity losses. Further, while humidity is naturally increasing, items stored in the cabinets are subject to the drying effect of heat. Moreover, because natural evaporation will be effected by the temperature within the cabinet, the rate of humidity adjustment may fluctuate with temperature changes, but humidity adjustments will probably lag behind such temperature changes.

Systems have been developed by which the heat and humidity levels of air within a cabinet could be more closely controlled. Air may be heated by passing it over or across various types of heating elements. Air may also be passed over or through water in order to raise the humidity of the air. Despite these improvements, the existing systems remain unable to precisely adjust for losses of heat or humidity due to disruptions to the cabinet environment, such as opening and closing the cabinet access and added or removing food products or other items. Further, the addition of heating elements and humidity generating means can create additional problems. If heat or humidity rise too quickly, the air within the cabinets could become overheated or too moist. Such uncontrolled fluctuations in heat and humidity can be detrimental to food products or other items stored within the cabinets.

Cabinets commonly are equipped with thermostats in an attempt to control the heat of the air circulating within the cabinets. By controlling the air temperature, however, the humidity of the air can also be affected. Nevertheless, such controls alone do not provide adequate control of the humidity within the cabinet. Moreover, a thermostat or manual potentiometer may not maintain temperature and humidity within predetermined parameters. Generally, such devices only cause the heating elements to heat the air when the air temperature falls below a set value.

These problems are readily solved by the present invention. Air temperature and humidity can be maintained within predetermined parameters despite the repeated opening and closing of the access to the cabinet and the addition or removal of food products or other items. The present invention not only can monitor both air temperature and humidity, but can react to and adjust for changes in either, or both, of them.

SUMMARY OF THE INVENTION

The present invention comprises a system for conditioning the environment within a cabinet, such as a food warming cabinet. The system may comprise a chamber for receiving food products or other items, that has at least one means of access, such as a door, drawer, or lid; heat and humidity detection devices for detecting air temperature and humidity within the chamber and for generating heat and humidity signals indicative of the air temperature and humidity within the chamber; and a processor for receiving the heat and humidity signals, comparing the signals to predetermined heat and humidity parameters, and providing output signals when the detected parameters do not coincide with the predetermined parameters. The heat and humidity detection devices may be a thermometer and a hygrometer, respectively. These devices may further be comprised of transducers which convert input measurements of air temperature and humidity into output readable by the processor. The processor may be a microprocessor which performs the control and data processing functions associated with the operation of the environment conditioning system.

The system also may comprise a heater, which is responsive to the output signals from the processor, for heating air prior to the air entering the chamber and a humidity control device responsive to the output signals for controlling the humidity of air prior to the air entering the chamber. In addition, the heater and the humidity control device may be contained within a module which may be mounted adjacent to the chamber.

The system may further comprise a forced air circulation device, such as a blower or fan, that is responsive to the output signals from the processor for circulating and recirculating at least a portion of the heated, humidity controlled air through the chamber. The heater may further comprise at least one air plenum containing an air heater, into which air driven by the forced air circulation device may be directed and which may be in communication with the humidity control device. The air heater may employ electricity, steam, or gas or waste heat from other apparatus to heat the air. The humidity control device may comprise a humidity generating space containing water or other suitable liquid in which a water heater is submerged, means for deflecting air from the heater into the humidity generating space, a baffle for directing the air into the water, and water level control device for monitoring and adjusting the level of water in the space. The water heater may employ electricity or steam or waste heat from other apparatus to heat the water.

The system may further comprise means for exhausting air containing heat and humidity in excess of the predetermined parameters. The means for exhausting may comprise ducting to remove such air from the chamber or the module, or both; a blower, a fan, or other device to create suction or overpressure to draw or drive such air from the chamber or the module; and means for sealing the ducting to prevent the unintentional loss of heat or humidity.

The system may also comprise means for recapturing water from air containing humidity in excess of the predetermined parameters. This means for recapturing may comprise means for conducting the air containing humidity in excess of said predetermined parameters out of the chamber or module, or both, and along the chamber's exterior. This may cool the air and cause the excess humidity to form as condensation on the chamber's exterior. The means for recapturing may further comprise means for collecting and conducting the condensation to a water reservoir. The level of the water in the humidity generating space is monitored by water level control device which may comprise a float or electronic level sensor and means for replenishing water to or removing water from the humidity generating space. The means for replenishing water to or for removing water from the space may comprise means for transferring condensation from the reservoir to the space and for transferring water from the space to the reservoir. This means may also comprise suitable piping, check valves, and pumps. The configuration of the means for transferring may depend in part on the location of the reservoir relative to the humidity generating space. The system may also comprise means for supplying water to the humidity generating space from an external water source or for removing water from the space to an external waste water drain. If neither the reservoir nor the external source is available to supply additional water to the space, or neither the reservoir nor the drain is available to accept water, a warning indicator may be activated.

It is an object of the system that the heat and humidity of air within the cabinet can be monitored and maintained within predetermined parameters despite the opening and closing of the chamber access and the addition of food products or other items to or their removal from the chamber. A feature of this system is the combination of the heat and humidity detection devices and a controlling processor. This system has the advantage of conditioning the environment within a cabinet despite frequent disruptions to that environment.

It is also an object of this system that the system can generate high humidity levels at high temperature levels. It is a feature of this system that the forced air circulation means can drive air to a heater and then to a humidity control device. Further, the humidity control device may include a water heater to heat the water and facilitate the generation of humidity. It is an advantage of this system that the air may be heated before it enters the humidity control device and again as it passes through the water in the humidity control device.

It is further an object of the system that the heater and humidity control device are contained in a module and that all environmental conditions in the chamber are monitored and controlled from this module. It is a feature of this system that the forced air circulation device drives air into at least one air plenum in which the air is heated. The air plenum is in communication with the humidity generation space, and if the humidity of the air within the chamber must be raised, the air is deflected into the space.

Additionally, it is an object of this system to permit some or all of the air containing heat or humidity in excess of the predetermined parameters to be exhausted from the chamber or the module, or both, and to recapture water from air containing humidity in excess of predetermined parameters. A feature of this system is means for conducting this air containing excess humidity along the chamber's exterior. The air may thus be cooled, and the excess humidity condensed on the chamber's exterior. This condensation is then collected and can be reused in the system. It is a further advantage of this system that the amount of water used in the humidity generating space may be reduced.

Other objects, features, and advantages will be apparent when the detailed description of the invention and the drawings are considered.

DETAILED DESCRIPTION OF THE INVENTION

Figure 1:
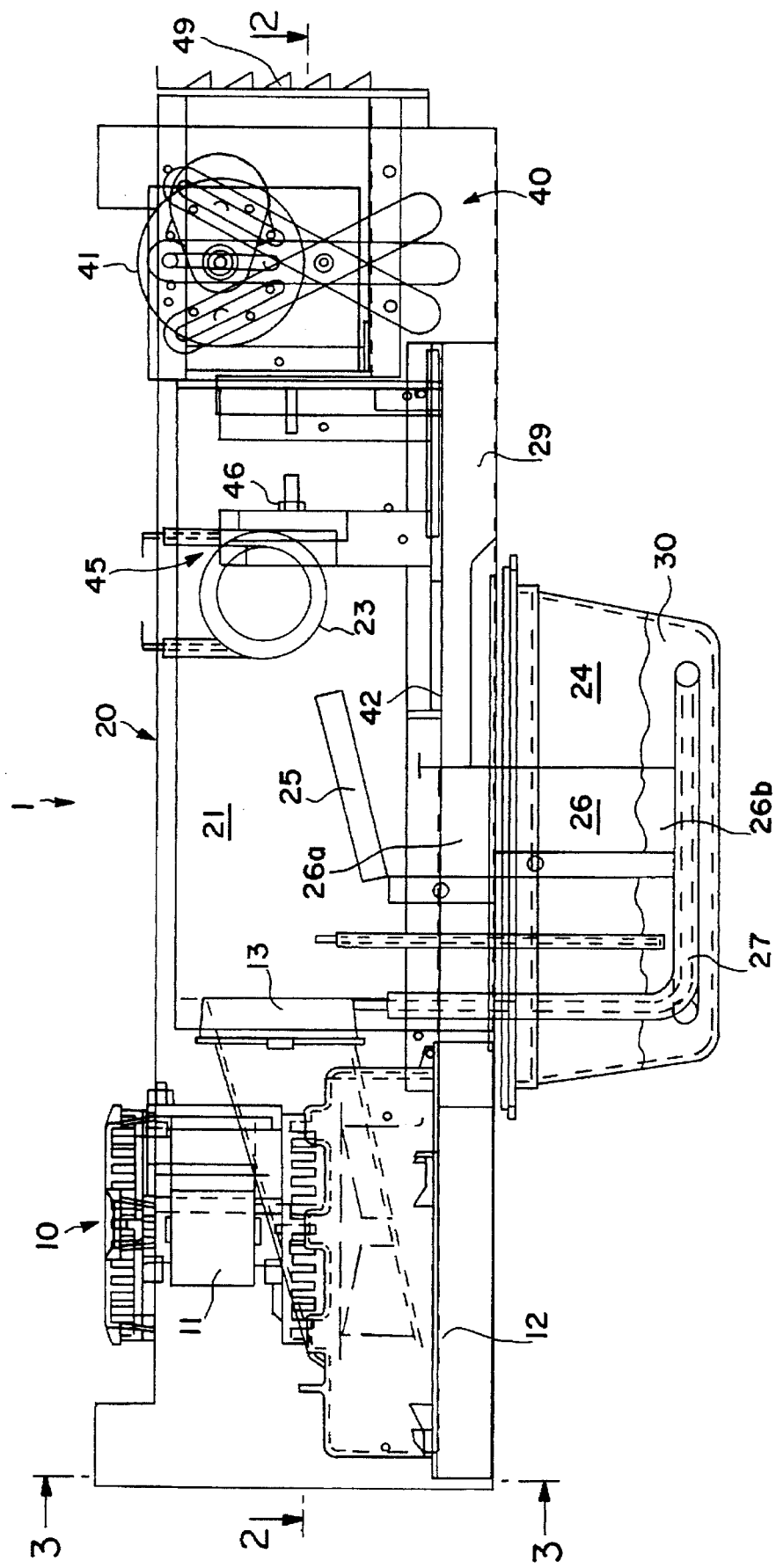
FIG. 1 is a cross-sectional side view of a preferred embodiment of the system showing the forced air circulation device and a module containing the heater and the humidity control device.

Referring to FIG. 1, an embodiment of the environment conditioning system, generally indicated as 1, is depicted comprising a centrifical blower 10 and a module 20. Blower 10 may have a blower motor 11, a cabinet air intake 12, and a blower discharge 13. Discharge 13 directs air from blower 10 into module 20.

Air entering module 20 passes into a first air plenum 21 and is circulated across an air heater 23. Air heater 23 is controlled by a microprocessor (not shown), which receives heat and humidity signals from a heat detection device such as a thermometer (not shown) and a hygrometer (not shown) detecting air temperature and humidity, respectively, within a chamber (not shown), such as a cabinet for receiving food products or other items. Although Motorola 68HC11 microprocessor is preferred, a Motorola 6803 microprocessor may be a suitable alternative. Further, a 1000 ohm platinum RTD probe is a preferred thermometer. Suitable hygrometers may include chilled mirror hygrometers, infrared absorption hygrometers, or integrated commercial humidity sensors. Chilled mirror hygrometers, however, are preferred. Air heater 23 heats the forced air entering air plenum 21 until the temperature of the air is within a range of predetermined temperature parameters. This range of temperature parameters is determined based on the type and quantity of food products or other items placed within the chamber.

If the microprocessor determines that the humidity of the air in the chamber is low after comparing measurements taken by the hygrometer and predetermined humidity parameters, air from air plenum 21 will be directed into a humidity generating space 24. In at least one embodiment, humidity generating space 24 may be located below air plenum 21 and is partially filled with water 30. Space 24 comprises a substantially rectangular baffle 26 and a water heater 27 which is submerged in water 30. Water heater 27 may also be controlled by the microprocessor. The temperature of water 30 is detected by a heat detection device (not shown). The microprocessor determines the optimum water temperature to achieve the desired air temperature and humidity level, given the temperature and humidity of the air entering space 24.

Baffle 26 has an upper and a lower end 26a and 26b and is partially submerged in water 30, such that air entering upper end 26a is discharged from lower end 26b into water 30 and directly onto water heater 27. After passing through water 30, the air returns to air plenum 21, and a portion of the air also enters a duct 29 by which it may be directed into the chamber.

Air circulating within air plenum 21 is initially directed into baffle 26 of space 24 by an air deflector 25. Air deflector 25 may be set at an angle of about forty-five (45) degrees relative to the horizontal. A humid air control system 40, however, operates a humidity solenoid 41 which moves a humidity damper 42 to open or close baffle 26. Humid air control system 40 is also controlled by the microprocessor, so that baffle 26 can be exposed to varying amounts of forced air by humidity damper 42. By controlling the temperature of the air in air plenum 21, the temperature of water 30 in space 24, and the amount of air entering baffle 26, the microprocessor can make fine adjustments to the air temperature and humidity in the chamber. Moreover, because the microprocessor controls humidity damper 42, it can control the amount of air flowing through space 24 and, thereby, the speed with which changes in humidity occur. The ability to control the rate at which changes in humidity occur is important to controlling condensation within the chamber (not shown) (and module 20).

If the heat detection means and the hygrometer indicate the heat or humidity of the air in the chamber are in excess of predetermined parameters, an exhaust control system 45 may cause some of this air to be exhausted from the chamber (and module 20). Exhaust control system 45 may operate an exhaust solenoid 46 which controls an exhaust damper 47. Exhaust damper 47 causes air containing excess heat and humidity to be redirected from air plenum 21 to the atmosphere through exhaust vents 48 or to means for recapturing water from air containing excess humidity (not shown). Moreover, blower 10 may be used to circulate and recirculate air within the chamber and module 20. Exhaust damper 47 also permits fresh (e.g., non-recirculated) air to be drawn into the chamber and module 20 through intake vents 49.

Figure 2:
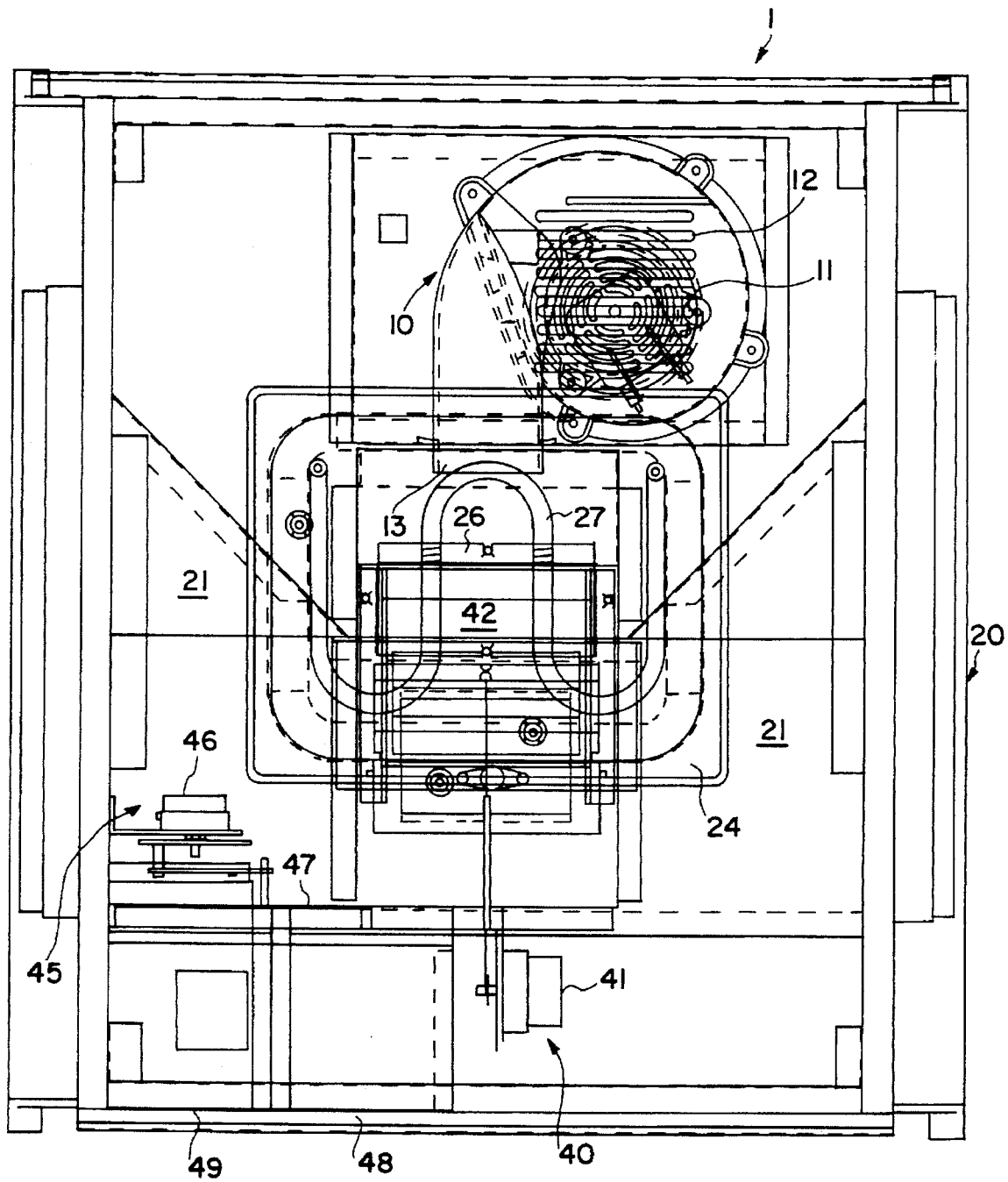
FIG. 2 is a cut-away, overhead view of the preferred embodiment of the system depicted in FIG. 1 along the line 2—2.
Figure 3:
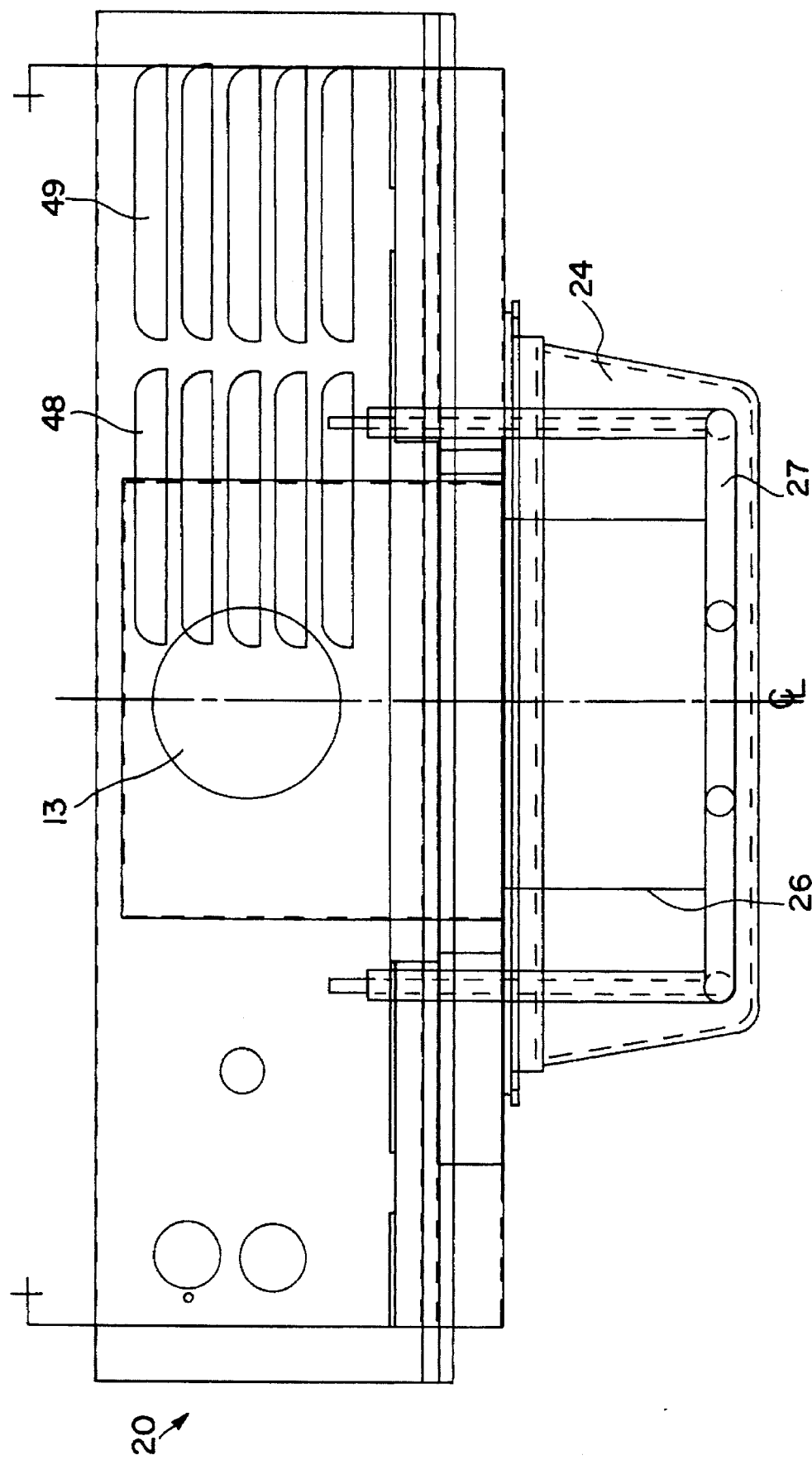
FIG. 3 is a cut-away, frontal view of the preferred embodiment of the system depicted in FIG. 1 along the line 3—3 with the internal components of the system, except for the water heater, removed.

FIGS. 2 and 3 depict the arrangement of humid air and exhaust control systems 40 and 45 and their supporting components. FIG. 3 depicts a cut-away frontal view of the system depicted in FIG. 1 along line 3—3. Blower discharge 13 is centrally located in the figure with exhaust and intake vents 48 and 49 located to the right of center line C.

In addition, system 1 may have ducts (not shown) for directing some or all of the air containing humidity in excess of the predetermined parameters to the exterior corners (not shown) of the chamber. It may be necessary to employ additional solenoids and dampers (not shown) to so direct this air. Once the air has been directed to the exterior corners of the chamber, it may be directed along the exterior of the chamber, so that it may be cooled, and water carried by this air may condense. Further, this condensation may be collected or allowed to drain to a reservoir (not shown) located beneath the chamber.

This reservoir may also be connected to space 24 by means for transferring condensation to space 24 and for transferring water from space 24 to the reservoir. This means (not shown) preferably comprises a pump and piping joining the reservoir with the pump and the pump with space 24. Alternatively, parallel lines of piping and multiple pumps may be used.

In a preferred embodiment, the humidity generating space 24 may be joined to an external source of water (not shown), so that water may be added to space 24 even when insufficient condensation exists in the reservoir. Space 24 may also be connected to a waste water drain (not shown), so that contaminated or fouled water may be removed from system 1 and replaced with new water from the external source or condensation from the reservoir. Moreover, the external source may supply water to space 24 via the reservoir, and water 30 may drain from space 24 via the reservoir. This embodiment may eliminate duplicating piping systems and permits the reservoir to be filled or drained independently from space 24.

If the level of water 30 in space 24 drops below a predetermined level or rises above a predetermined level, water level control device (not shown) preferably signals the microprocessor of this change in condition. The microprocessor may then signal the means for transferring to pump water from or to the reservoir. If the reservoir is empty and cannot supply additional water or if it is full and can not accept additional water, the microprocessor may signal the means for transferring to draw water from the external source or to dump water to the waste water drain. If, for any reason, water can not be drawn from either the reservoir or the external source or dumped to either the reservoir or the waste water drain, the microprocessor may initiate appropriate an warning indicator, preferably, audio and visual signals, to attract an operator or technician.

Although a detailed description of the present invention has been provided above, it is to be understood that the scope of the invention is not to be limited thereby, but is to be determined by the claims which follow.

I claim:

1. An environment conditioning system comprising:

a chamber for receiving food products, said chamber having at least one means of access thereto;

heat and humidity detection devices within said chamber for detecting heat and humidity parameters and generating heat and humidity signals indicative thereof;

a processor for receiving said heat and humidity signals, comparing said signals to predetermined heat and humidity parameters, and providing output signals when said detected parameters do not coincide with said predetermined parameters;

a module including: a heater responsive to said output signals for heating air prior to said air entering said chamber, in said module and a humidity control device responsive to said output signals for controlling the humidity of air prior to said air entering said chamber, in said module; and a forced air circulation device responsive to said output signals for circulating and recirculating at least a portion of the heated, humidity controlled air through said chamber;

wherein said module is mounted adjacent to said chamber; and wherein said heater comprises at least one air plenum containing an air heater, into which said air driven by said forced air circulation device is directed and which is in communication with said humidity control device.

2. The environmental conditioning system of claim 1 wherein said humidity control device comprises a humidity generating space containing water into which a water heater is submerged, means for deflecting said air from said heater into said space, a baffle for directing said air into said water, and water level control device for monitoring and adjusting the level of water in said space.

3. The environmental conditioning system of claim 2 further comprising means for exhausting air containing heat and humidity in excess of said predetermined parameters.

4. The environmental conditioning system of claim 3 wherein said monitoring and adjusting device comprises means for supplying water to or removing water from said space.

5. The environmental conditioning system of claim 4 wherein said chamber has at least one wall and further comprising means for recapturing water from air containing humidity in excess of said predetermined parameters from said chamber's at least one wall.

6. The environmental conditioning system of claim 5 wherein said means for recapturing water comprises means for conducting said air containing humidity in excess of said predetermined parameters along said chamber's at least one wall thus cooling said air and causing said excess humidity to form as condensation on said chamber's at least one wall and means for conducting said condensation to a water reservoir.

7. The environmental conditioning system of claim 6 further comprising means for transferring condensation from said reservoir to said space.

8. An environment conditioning system comprising:
- a chamber for receiving food products, said chamber having at least one means of access thereto;
- heat and humidity detection devices within said chamber for detecting heat and humidity parameters and generating heat and humidity signals indicative thereof;
- a processor for receiving said heat and humidity signals, comparing said signals to predetermined heat and humidity parameters, and providing output signals when said detected parameters do not coincide with said predetermined parameters;
- a module including: a heater responsive to said output signals for heating air prior to said air entering said chamber, in said module and
- a humidity control device responsive to said output signals for controlling the humidity of air prior to said air entering said chamber, in said module; and
- a forced air circulation device responsive to said output signals for circulating and recirculating at least a portion of the heated, humidity controlled air through said chamber;

wherein said heater comprises at least one air plenum containing an air heater, into which said air driven by said forced air circulation device is directed and which is in communication with said humidity control device.

9. The environmental conditioning system of claim 8 wherein said humidity control device comprises a humidity generating space containing water into which a water heater is submerged, means for deflecting said air from said heater into said space, a baffle for directing said air into said water, and water level control device for monitoring and adjusting the level of water in said space.

10. The environmental conditioning system of claim 9 further comprising means to exhaust air containing heat and humidity in excess of said predetermined parameters.

11. An environment conditioning system comprising:
- a chamber for receiving food products, said chamber having at least one means of access thereto;
- heat and humidity detection devices within said chamber for detecting heat and humidity parameters and generating heat and humidity signals indicative thereof;
- a processor for receiving said heat and humidity signals, comparing said signals to predetermined heat and humidity parameters, and providing output signals when said detected parameters do not coincide with said predetermined parameters;
- a module including: a heater responsive to said output signals for heating air prior to said air entering said chamber, in said module and
- a humidity control device responsive to said output signals for controlling the humidity of air prior to said air entering said chamber, in said module; and
- a forced air circulation device responsive to said output signals for circulating and recirculating at least a portion of the heated, humidity controlled air through said chamber;

wherein said humidity control device comprises a humidity generating space containing water into which a water heater is submerged, means for deflecting said air from said heater means into said space, a baffle for directing said air into said water, and water level control device for monitoring and adjusting the level of water in said space.

12. The environmental conditioning system of claim 11 further comprising means to exhaust air containing heat and humidity in excess of said predetermined parameters.

13. An environment conditioning system comprising:
- a chamber for receiving food products, said chamber having at least one means of access thereto;
- a heat sensing probe and a hygrometer within said chamber for detecting heat and humidity parameters and means for generating heat and humidity signals indicative thereof;
- a microprocessor for receiving said heat and humidity signals, comparing said signals to predetermined heat and humidity parameters and providing output signals when said detected parameters and providing output signals when said detected parameters do not coincide with said predetermined parameters;
- a module divided into an air plenum, a secondary plenum, and a humidity generation space;
- a blower responsive to said output signals for circulating and recirculating at least a portion of said air through said module and said chamber;
- an air heater located in said air plenum, which is responsive to said output signals for heating said air prior to said air entering said chamber;
- an air deflector within said air plenum for directing the flow of said air into said humidity generation space, a water heater submerged in water in said humidity generation space, a baffle for directing said air into said water; and humid air control system for controlling the flow of air into said baffle, which system is responsive to said output signals; and
- ducts for exhausting air containing heat and humidity in excess of said predetermined parameters from said module.

14. The environmental conditioning system of claim 13 wherein said chamber has at least one wall and further comprising means for recapturing water from air containing humidity in excess of said predetermined parameters from said chamber's at least one wall.

15. The environmental conditioning system of claim 13 wherein said monitoring and adjusting device comprises means for supplying water to or removing water from said space.

16. The environmental conditioning system of claim 15 wherein said chamber has at least one wall and further comprising means for recapturing water from air containing humidity in excess of said predetermined parameters from said chamber's at least one wall.

17. The environmental conditioning system of claim 16 wherein said means for recapturing water comprises means for conducting said air containing humidity in excess of said predetermined parameters along said chamber's at least one wall thus cooling said air and causing said excess humidity to form as condensation on said chamber's at least one wall and means for conducting said condensation to a water reservoir.

18. The environmental conditioning system of claim 17 further comprising means for transferring condensation from said reservoir to said space.

* * * * *